United States Patent [19]

Tykwinski

[11] 4,262,916
[45] Apr. 21, 1981

[54] CHUCK HAVING KEEP STOP AND ACCESSORIES

[76] Inventor: Leonard M. Tykwinski, 910 First Ave., Cadillac, Mich. 49601

[21] Appl. No.: 968,635

[22] Filed: Dec. 12, 1978

[51] Int. Cl.³ .......................................... B23B 31/02
[52] U.S. Cl. ..................................... 279/1 S; 279/110
[58] Field of Search ................ 279/1 S, 110; 82/34 C

[56] References Cited

U.S. PATENT DOCUMENTS

| | | | |
|---|---|---|---|
| 2,515,289 | 7/1950 | Bergmann | 279/1 S |
| 3,032,347 | 5/1962 | Cambron | 279/110 X |
| 3,779,566 | 12/1973 | Tarbox et al. | 279/1 S |
| 3,876,214 | 4/1975 | Blanchard | 279/1 S |

Primary Examiner—Gil Weidenfeld
Attorney, Agent, or Firm—Clarence A. O'Brien; Harvey B. Jacobson

[57] ABSTRACT

Workpiece stop structure is provided for workpieces to be supported from and rotated by adjustable jaw chucks and collets. The stop structure may be used to great advantage in that successive workpieces may be tooled or cut to the same length dimensions with a minimum of effort. Further, the stop structure includes several different forms, all of which may be readily adjusted to accommodate workpieces of different lengths and the disclosure further includes an insertion tool for facilitating proper insertion of an expandable plug portion within a supportive hollow cylindrical member.

7 Claims, 13 Drawing Figures

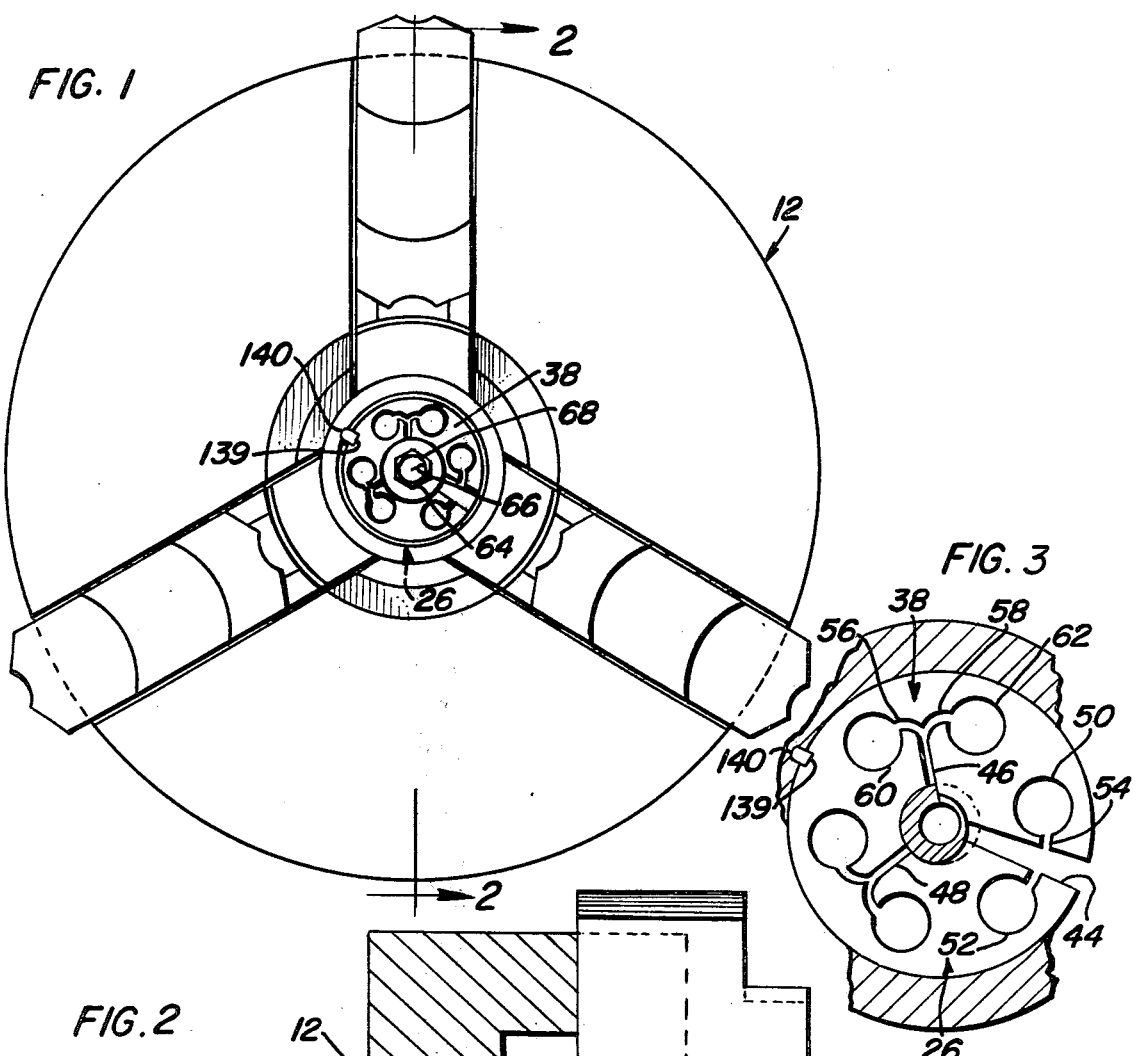
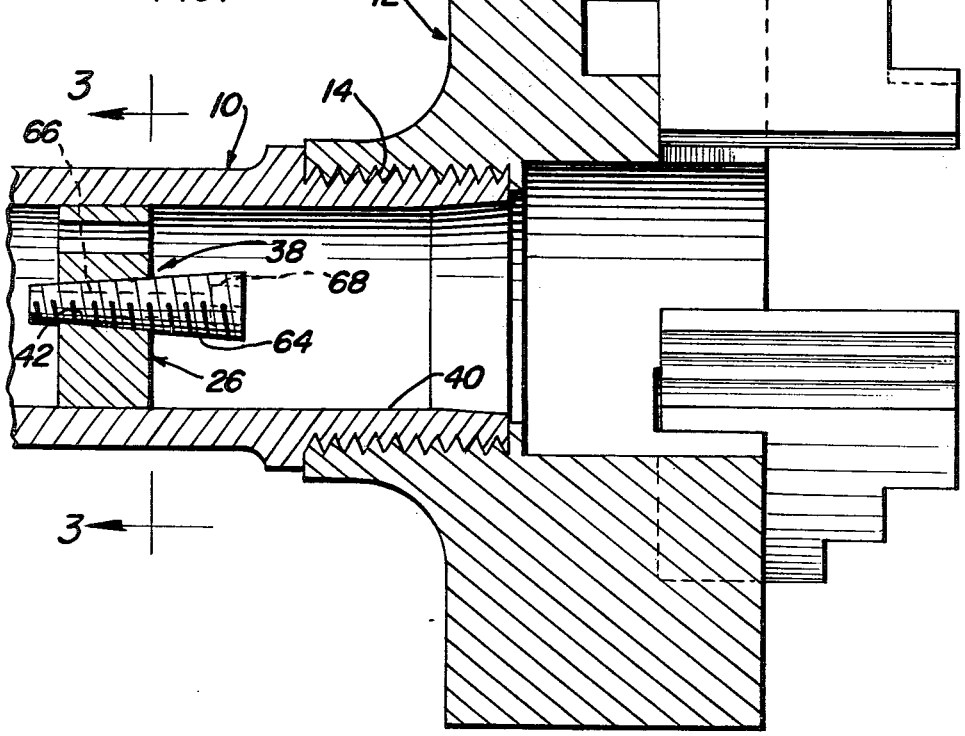

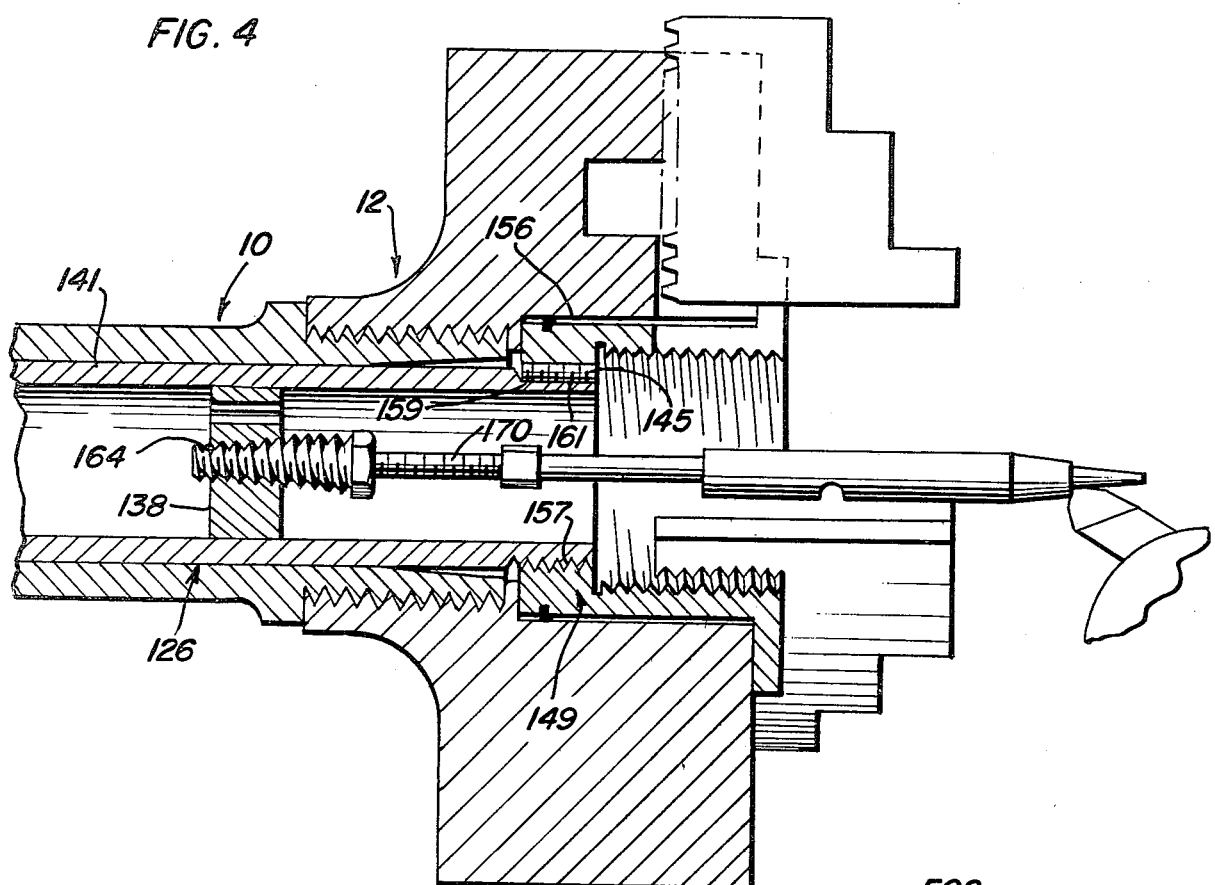
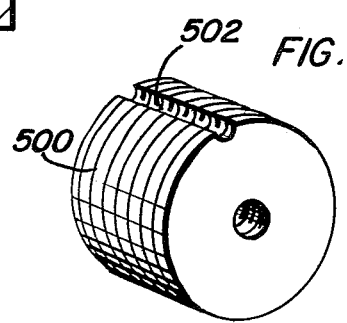
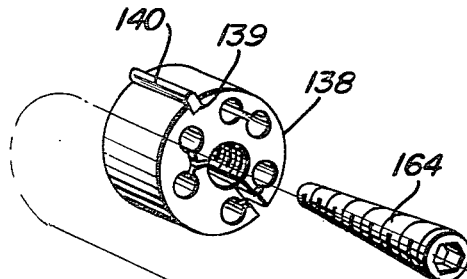
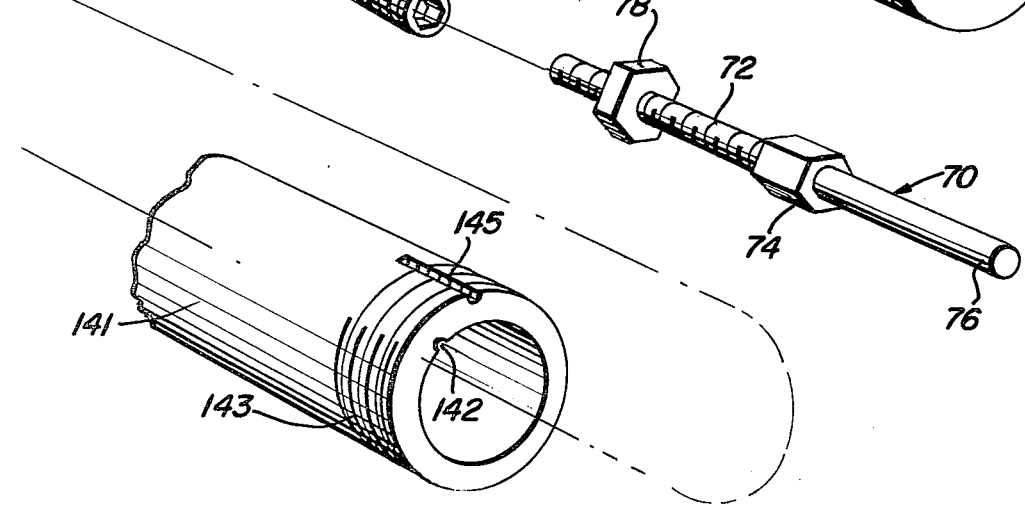

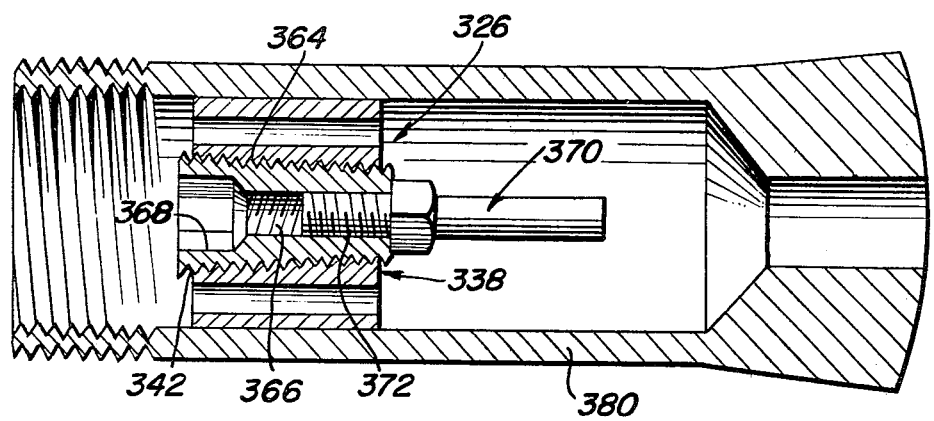
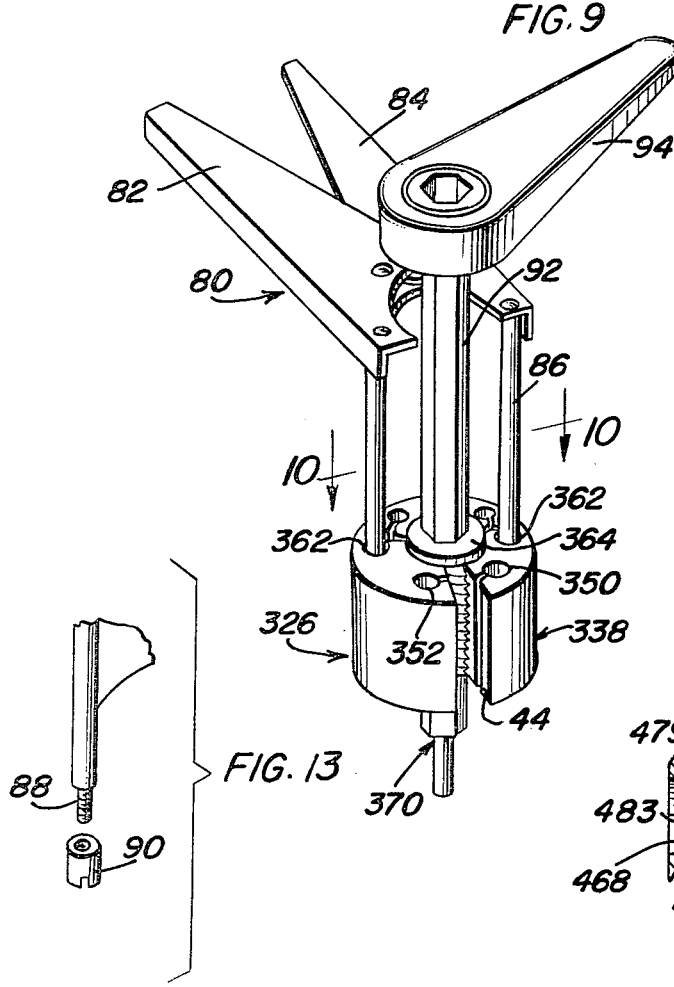
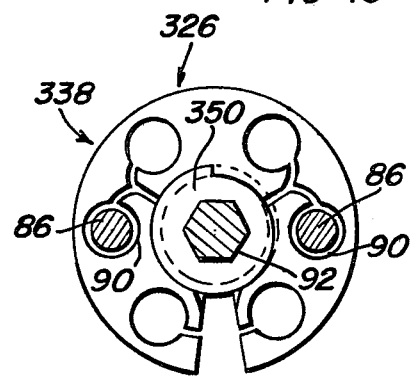
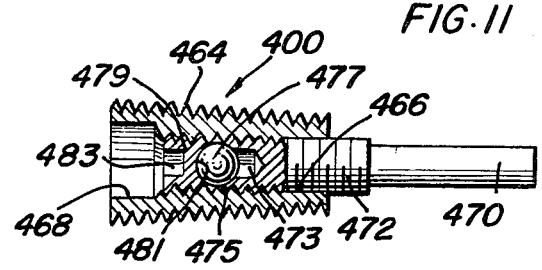

4,262,916

CHUCK HAVING KEEP STOP AND ACCESSORIES

BACKGROUND OF THE INVENTION

Various forms of workpiece stops heretofore have been provided for use in conjunction with machine tool spindles of lathes, screw machines, and surface grinders, etc., but most of these machine tool workpiece stops are constructed in a manner whereby they are adapted for use in conjunction with a specific machine tool and may not be readily transferred from one form of machine tool to another. Examples of various forms of workpiece stops and other structures including some of the general structural and operational features of the instant invention are disclosed in U.S. Pat. Nos. 313,562, 866.788, 2,189,968, 2,361,085, 2,423,551, 2,450,004, 3,779,566, and 3,876,214.

BRIEF DESCRIPTION OF THE INVENTION

The workpiece stop structure of the instant invention is constructed in a manner whereby it may be, in various combinations of elements thereof, utilized in conjunction with many different forms of machine tools. In addition, the workpiece stop assembly includes tool accessories whereby various forms thereof may be readily installed on and removed from different forms of machine tools.

The main object of this invention is to provide a machine tool workpiece stop assembly constructed in a manner whereby various combinations of elements of the assembly may be utilized in conjunction with different machine tools.

Another object of this invention is to provide a workpiece stop assembly constructed in a manner whereby it may be readily mounted on and removed from an associated machine tool.

A further important object of this invention is to provide a stop assembly which may be readily adjusted for use in conjunction with different forms of workpieces.

Another object of this invention is to provide a workpiece stop which may be readily adjusted, as desired, for tooling workpieces having different longitudinal dimensions.

A final object of this invention to be specifically enumerated herein is to provide a workpiece stop assembly in accordance with the preceding objects and which will conform to conventional forms of manufacture, be of simple construction and easy to use so as to provide a device that will be economically feasible long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is an end elevational view of a first form of workpiece stop assembly operatively associated with a lathe spindle mounted adjustable jaw chuck;

FIG. 2 is a fragmentary vertical sectional view taken substantially upon the plane indicated by the section line 2—2 of FIG. 1 but with the adjustable stop assembly thereof removed;

FIG. 3 is an enlarged fragmentary transverse vertical sectional view taken substantially upon the plane indicated by the section line 3—3 of FIG. 2;

FIG.4 is a fragmentary longitudinal vertical sectional view similar to FIG. 2 but illustrating a second form of workpiece stop structure constructed in accordance with the present invention and with the jaws of the associated chuck in retracted positions;

FIG. 5 is an exploded perspective view of the various components of the second form of stop structure illustrated in FIG. 4

FIG. 8 is a longitudinal vertical sectional view of a fourth form of workpiece stop structure constructed in accordance with the present invention and operatively associated with a collet;

FIG. 9 is a perspective view of a pair of tools to be utilized in inserting the expandable plug portion of the fourth form of workpiece stop structure in position;

FIG. 10 is an enlarged fragmentary horizontal sectional view taken substantially upon the plane indicated by the section line 10—10 of FIG. 9;

FIG. 11 is a longitudinal vertical sectional view of a modified form of mini stop;

FIG. 12 is a perspective view of a solid plug for the workpiece stop structure illustrated in FIG. 6; and FIG. 13 is a fragmentary exploded perspective view of the lower end of one of the legs of the plier-type tool illustrated in FIG. 9 and showing the manner in which removable cylindrical adapters of different diameters may be removably secured to the lower ends of the tool legs.

DETAILED DESCRIPTION OF THE INVENTION

Figure 6:
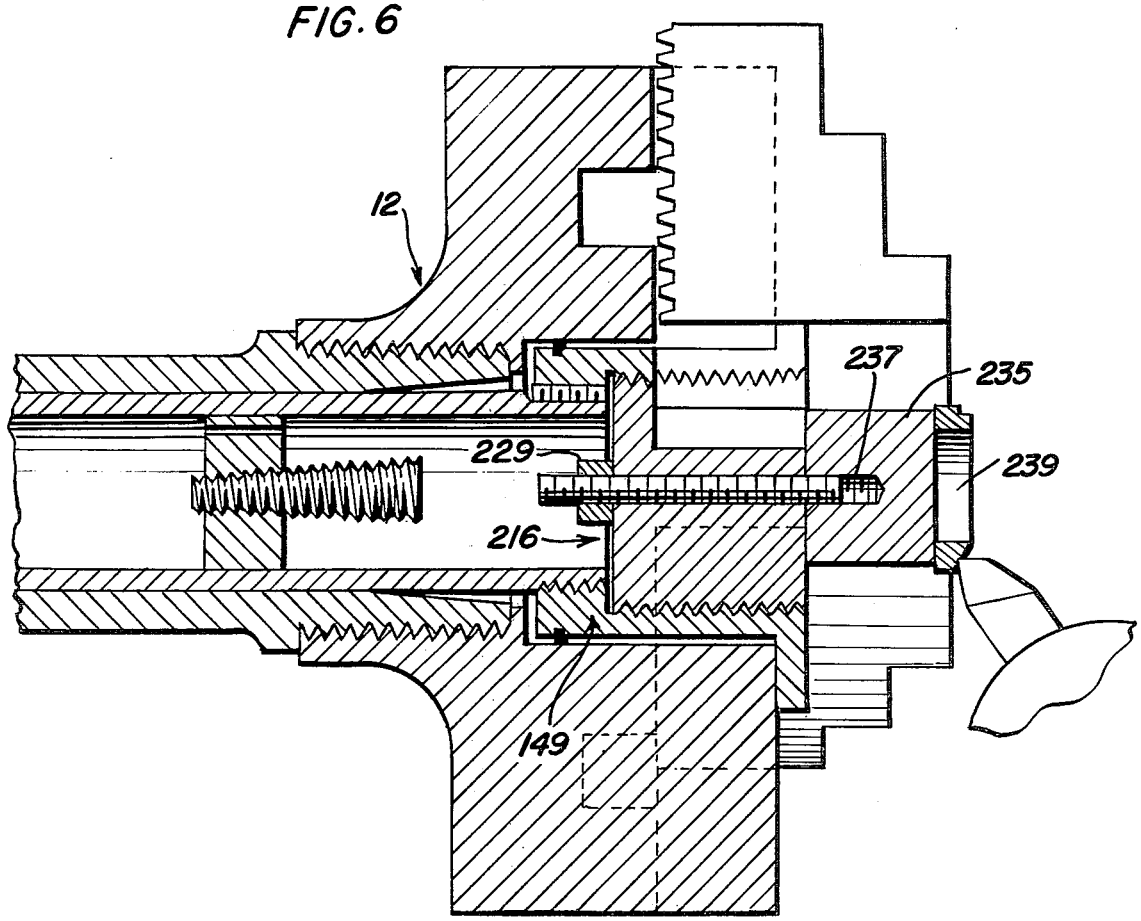
FIG. 6 is a longitudinal vertical sectional view similar to FIG. 4 but illustrating a third form of workpiece stop structure constructed in accordance with the present invention.
Figure 7:
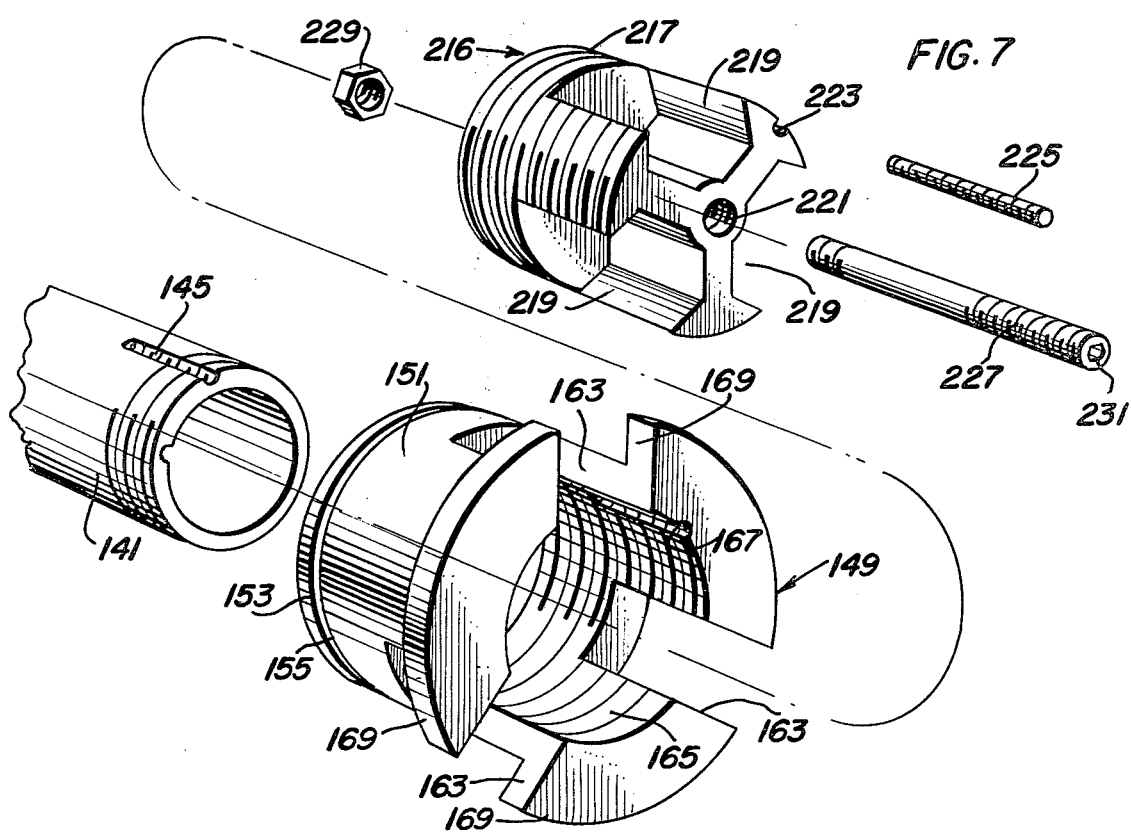
FIG. 7 is an exploded perspective view of the various components of the workpiece stop structure illustrated in FIG. 6.

Referring now more specifically to the drawings, the numberal 10 generally designates a machine tool spindle such as that utilized on a lathe and from which an adjustable jaw chuck referred to in general by the reference numeral 12 is removably supported by a threaded connection 14 between the spindle 10 and the chuck 12.

A first form of workpiece stop structure constructed in accordance with the present invention is referred to in general by the reference numeral 26 and includes an expandable cylindrical plug referred to in general by the reference numeral 38. The end of the spindle 10 upon which the chuck 12 is removably threadedly supported is hollow and thus defines a bore 40 opening endwise outwardly of the end of the spindle 10 upon which the chuck 12 is mounted. The plug 38 includes a central tapered threaded bore 42 formed therethrough and is radially slotted, fully, as at 44, and partially radially slotted, as at 46 and 48, see FIG. 3. The slot 44 extends fully radially of the plug 38 and opens outwardly through the outer surface of the plug 38 and inwardly into the tapered threaded bore 42. Disposed immediately on opposite sides of the slot 44 and a first pair of circumferentially spaced bores 50 and 52 formed through the plug 38 and each of the bores 50 and 52 is communicated with the slot 44 by means of a short slot 54. The slots 46 and 48 open inwardly into the threaded tapered bore 42 but terminate radially outwardly inwardly of the outer periphery of the plug 38 and each slot 46 and 48 includes an outer end which branches into a pair of branch slots 56 and 58 opening into a pair of circumferentially spaced bores 60 and 62 formed through the plug 38 corresponding to the bores 50 and 52.

A externally threaded tapered wedge 64 is provided and is removably threaded in the bore 42. The wedge 64 has a constant diameter threaded bore 66 formed centrally therethrough and the end of the threaded bore opening outwardly of the larger diameter end of the wedge 64 includes a counterbore 68 of hexagonal cross-sectional shape. Although not illustrated in FIG. 2, the stop structure 26 includes an adjustable length stop referred to in general by the reference numeral 70, see FIG. 5, and the stop 70 comprises an elongated stop externally threaded as at 72 on one end, having a hexagonal enlargement 74 thereon intermediate its opposite ends and including a smooth cylindrical end 76 remote from the externally threaded end 72. A jamb nut 78 is provided and threaded on the externally threaded end 72. The terminal end of the threaded end 72 may be removably threadedly engaged in the bore 66 and the nut 78 may be threaded tight against the adjacent end of wedge 64.

With attention now invited more specifically to FIG. 4 of the drawings, a second form of stop structure referred to in general by the reference numeral 126 is disclosed. The stop structure 126 includes a plug 138 corresponding to the plug 38, a wedge 164 corresponding to the wedge 64, and a stop 170 corresponding to the stop 70. The plug 138 includes an axial keyway 139 formed therein, see FIG. 5, extending longitudinally of one outer peripheral portion of the plug 138 and a lug 140 is secured in the keyway 139. A keep tube 141, FIG. 4, is provided and includes an internal groove 142 in which the key 140 is receivable and the keep tube 141 is telescoped within the spindle 10 and includes an externally threaded outer end portion 143 provided with a threaded half cylindrical bore 145. It is to be noted that the plug 38 also includes a keyway 139 and a lug 140, see FIG. 3, and that the lug 140 of the plug 38 is received in an internal groove 139 broached in the spindle 10.

The stop structure 126 additionally includes a keeper referred to in general by the reference numeral 149 and the keeper 149 includes a cylindrical end portion 151 provided with a circumferential groove 153 in which an O-ring 155 is seated and the cylindrical end portion 151 is snugly received within the outer end bore portion 156 of the chuck 12, see FIG. 4, the O-ring 155 serving to prevent shaking or vibration of the keeper 149 within the outer end bore portion 156.

The cylindrical end portion 151 of the keeper 149 includes a small diameter threaded bore 157 formed therein in which the externally threaded outer end portion 143 of the keep tube 141 is threadedly engaged and the bore 157 includes a threaded half cylindrical bore 159 which mates with the half cylindrical bore 145 in order to form a bore in which a threaded keeper screw 161 may be threadedly received in order to prevent relative rotation between the keep tube 141 and the keeper 149. The end of the keeper 149 remote from the groove 153 includes radial slots 163 formed therein and opening outwardly of the corresponding end of the keeper 149 for receiving the jaws of the chuck 12 therethrough and the interior of the slotted end of the keeper is threaded as at 165 and includes a half cylindrical threaded bore 167 formed therein. Also, the end of the keeper 149 remote from the groove 153 includes laterally outwardly projecting flanges 169 extending between adjacent slots 153, the flanges 169 being abuttable against the outer face portios of the chuck 12 between the jaws of the chuck.

With attention now invited more specifically to FIG. 6 of the drawings, there may be seen a third form of stop structure referred to in general by the reference numeral 216. The stop structure 216 includes all of the structure of the stop structure 126, except for the structures 138, 164 and 170 thereof, and instead includes an externally threaded keeper plug 217 including radially outwardly opening notches 219 spaced circumferentially thereabout for receiving the jaws of the chuck 12 and having a central threaded bore 221 formed therethrough. The keeper plug 217 is threadedly receivable within the threaded interior of the keeper 149 and includes a half cylindrical threaded bore 223 registrable with the half cylindrical bore 167 to form a threaded bore in which a lock screw 225 may be threadedly engaged. The notches 219 are registrable with slots 163 of the keeper 149 and an externally threaded union stop 227 is threaded through the bore 221 and has a jamb nut 229 threaded thereon jambed against the inner face of the keeper plug 217. The outer end of the union stop 227 includes a blind bore 231 of hexagonal cross-sectional shape for receiving one end of a rod similar to the rod 92. Also, an abutment block 235 is provided for reception between the jaws of the chuck 12 and the block 235 includes a blind bore 237 in which the protruding end of the union stop 227 is threadedly engaged, the block 235 being jambed against the outer end face of the keeper plug 217. Of course, the workpiece 239 may be received between the jaws of the chuck 12 outwardly of the outer end of the abutment block 235 in order to allow a very short workpiece 239 to be turned.

Referring now more specifically to FIG. 8 of the drawings, a fourth form of stop structure referred to in general by the reference numeral 326 is illustrated. The stop structure 326 is substantially similar to the stop structure 126, except that the stop 370 thereof corresponding to the stop 70 is considerably shorter and does not include a jamb nut corresponding to the jamb nut 78. However, the externally threaded end 372 of the stop structure 370 is threadedly engaged in the threaded bore 366 formed through the wedge 364 corresponding to the wedge 64 and the latter is threadedly engaged in the tapered threaded bore 342 formed in the plug 338 corresponding to the plug 38. In addition, it will be seen that the stop structure 326 is expanded within a collet 380.

An installation tool referred to in general by the reference numeral 80 is provided and includes a pair of pivotally interconnected levers 82 and 84 provided with laterally projecting parallel extension rods 86 on their jaw ends. The free ends of the extensions 86 are diametrically reduced and externally threaded as at 88 and have replaceable heads 90 removably threadedly engaged thereon.

When the stop structure 326 is to be placed in position, the pair of heads 90 carried by the extensions 86 are inserted into the bores 362, corresponding to the bores 62, in the manner illustrated in FIG. 9 of the drawings and the tool 80 may then be utilized to contract and place the stop structure 326 in position within the collet 380. When the stop structure 326 is in the desired position, the tool 80 may have the handle ends of the levers 82 and 84 remote from the extensions 86 squeezed together in order to slightly expand the plug 338 and frictionally retain the plug 338 in position within the collet 380. Thereafter, a hexagonal rod 92 has one end thereof seatingly engaged in the counterbore 368 and a ratchet handle 94 is engaged over the other end of the rod 92, whereby the ratchet handle 94 may be utilized to threadedly advance the wedge 364 into the tapered threaded bore 342 of the plug 338 while the latter is held in the desired position by means of the tool 80. Of course, as the wedge 364 is threaded into the tapered threaded bore 342, the plug 338 is tightly expanded in position. After the plug 338 has been secured in the desired position, the rod 92 and tool 80 may be removed through the open outer end of the chuck 12, the stop 370 previously having been threadedly secured in position. The plugs 38 and 138 may be similarly installed through the use of the tools 80, 92 and 94.

Of course, a workpiece to be gripped between the jaws of the chuck 12 may have its inner end abutted against the end face of the end 76 of the stop 70.

With attention now invited more specifically to FIG. 11 of the drawings, there may be seen a modified form of wedge and stop assembly referred to in general by the reference numeral 400 and which may be utilized in lieu of the structures 364 and 370. The assembly 400 includes a wedge 464 which may be substantially identical to the wedge 364, but the assembly 400 includes a stop 470 whose externally threaded end 472 includes a hexagonal counterbore 473 opening outwardly into a partial spherical seat 475 against which a spherical ball 477 is seated. In addition, in the end of the through bore 466 formed through the wedge 464 which opens into the hexagonal counterbore 468 a threaded plug 479 is threadedly engaged including a partial spherical seat 481 seated against the spherical member 477 and the plug 479 includes a small transverse dimensioned hexagonal blind bore 483 opening outwardly of the outer end of the counterbore 468. When the assembly 400 is utilized, the stop 470 may be readily changed and substituted for by a similar stop of different length without otherwise altering the positioning of the assembly 400.

Still further, with attention now invited more specifically to FIG. 12 of the drawings, a plug referred to in general by the reference numeral 500 is illustrated and it is to be noted that the plug 500 may be utilized in lieu of the keep plug 217, the plug 500 including a half cylindrical threaded bore 502 corresponding to the half cyliIndrical threaded bore 223 of the keeper plug 219. Of course, the plug 500 can only be used with the jaws of the chuck 12 are retracted outwardly of the threaded interior 165 of the keeper 149.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A rotary hollow lathe spindle having a chuck supported on one end for rotation therewith, said chuck defining an elongated central cavity therein concentric with the axis of rotation of said spindle and opening endwise outwardly of said one spindle end, said chuck including three radially shiftable jaw members shiftable in radial paths spaced outwardly of the inner end of said cavity, a keep tube supported within and projecting outwardly of said one spindle end and terminating outwardly inwardly of said radial paths, a keeper including a hollow cylindrical body having inner and outer ends, the inner end of said hollow body being removably telescoped over and supported from the outwardly projecting end of said keep tube inwardly of said paths, said hollow body including three radial slots formed therein aligned with said paths and opening endwise outwardly through said outer end of said cylindrical body, a cylindrical stop structure removably telescoped and secured within said cylindrical body and including radial notches formed therein, the outer end face of said cylindrical stop structure being disposed inwardly of the outermost portions of said jaws and comprising a stop surface against which a workpiece may be abutted, said slots, notches and paths being registered for receiving said jaws through said slots and in said notches to engage a short workpiece abuttingly supported from said stop surface.

2. The combination of claim 1 wherein said cylindrical stop structure includes a central core portion inward of the inner extremities of said notches and having a center threaded bore formed therein opening endwise outwardly of said stop surface, a threaded shank having one end threaded in said central bore, an abutment block having a blind threaded bore formed therein opening endwise outwardly of one side of said abutment block, the other end of said threaded shank projecting outwardly of said stop surface, said other shank end being threaded in the last mentioned bore with said one side of said abutment block abutted against said stop surface, said jaws including outer ends projecting outwardly beyond the side of said abutment block remote from said one side thereof, whereby the outer extremities of said jaws may engage and grip a workpiece abutted against said side of said abutment block remote from said one side thereof.

3. The combination of claim 1 wherein said inner end of said hollow cylindrical body is internally threaded and the end of said keep tube projecting outwardly of said one spindle end is externally threaded, said inner end of said hollow cylindrical body being threaded on the outwardly projecting end of said keep tube.

4. The combination of claim 1 wherein the portion of said hollow cylindrical body disposed outwardly of the outwardly projecting end of said keep tube is internally threaded and said cylindrical stop structure is externally threaded and threadedly engaged within said hollow cylindrical body.

5. The combination of claim 2 wherein said center threaded bore in said cylindrical stop structure extends completely therethrough, said threaded shank extending completely through and beyond the opposite ends of said center bore, the end of said threaded shank projecting from the inner end of said cylindrical body having a jam nut threadedly engaged thereon.

6. The combination of claim 5 wherein said inner end of said hollow cylindrical body is internally threaded and the end of said keep tube projecting outwardly of said one spindle end is externally threaded, said inner end of said hollow cylindrical body being threaded on the outwardly projecting end of said keep tube.

7. The combination of claim 6 wherein the portion of said hollow cylindrical body disposed outwardly of the outwardly projecting end of said keep tube is internally threaded and said cylindrical stop structure is externally threaded and threadedly engaged within said hollow cylindrical body.

* * * * *